United States Patent
Tonetti et al.

(10) Patent No.: US 6,666,020 B2
(45) Date of Patent: Dec. 23, 2003

(54) METHOD OF INITIATING REGENERATION OF A PARTICULATE FILTER FOR A DIRECT-INJECTION DIESEL ENGINE WITH A COMMON RAIL INJECTION SYSTEM

(75) Inventors: Marco Tonetti, Turin (IT); Giovanni Maria Rossi Sebastiano, Turin (IT); Maurizio Mugnaini, Orbassano (IT); Pierluigi Rellecati, Orbassano (IT)

(73) Assignee: C.R.F. Societa Consortile per Azioni (IT)

( * ) Notice: Subject to any disclaimer, the term of this patent is extended or adjusted under 35 U.S.C. 154(b) by 0 days.

(21) Appl. No.: 10/211,170

(22) Filed: Aug. 1, 2002

(65) Prior Publication Data

US 2003/0033800 A1 Feb. 20, 2003

(30) Foreign Application Priority Data

Aug. 3, 2001 (IT) ...................................... TO2001A0786

(51) Int. Cl.⁷ ................................................ F01N 3/00
(52) U.S. Cl. ............................ 60/286; 60/274; 60/285; 60/295; 60/297; 123/299; 123/300
(58) Field of Search .......................... 60/274, 278, 285, 60/286, 295, 297, 311; 123/299, 300

(56) References Cited

U.S. PATENT DOCUMENTS

| | | | |
|---|---|---|---|
| 5,826,425 A | * 10/1998 | Rossi Sebastiano et al. | .. 60/274 |
| 5,975,046 A | * 11/1999 | Kaneko et al. | ............. 123/300 |
| 6,041,591 A | * 3/2000 | Kaneko et al. | ................ 60/274 |
| 6,378,297 B1 | * 4/2002 | Ito et al. | ....................... 60/284 |
| 6,546,721 B2 | * 4/2003 | Hirota et al. | .................. 60/297 |

* cited by examiner

Primary Examiner—Binh Tran
(74) Attorney, Agent, or Firm—Ostrolenk, Faber, Gerb & Soffen, LLP

(57) ABSTRACT

A method of initiating regeneration of a particulate filter for a diesel engine having a common rail injection system permitting, at each engine cycle and in each cylinder of the engine, a fuel injection strategy performing one or more of the following injections; a main injection; a first pre-injection preceding the main injection and performed at the compression stroke; a second pre-injection preceding the main injection and following the first pre-injection; a first post-injection following the main injection; and a second post-injection following the first post-injection and performed at the exhaust stroke; the second pre-injection and the first post-injection being performed close enough to the main injection to participate, together with the main injection, in the actual fuel combustion phase, and wherein the timing of one or more of the injections performed is varied with respect to the timing of the injections in particulate filter non-regenerating conditions.

35 Claims, 2 Drawing Sheets

METHOD OF INITIATING REGENERATION OF A PARTICULATE FILTER FOR A DIRECT-INJECTION DIESEL ENGINE WITH A COMMON RAIL INJECTION SYSTEM

The present invention relates to a method of initiating regeneration of a particulate filter for a direct-injection diesel engine with a common rail injection system.

BACKGROUND OF THE INVENTION

As is known, in many countries, the regulations governing atmospheric pollution are becoming increasingly strict with regard to the composition of internal combustion engine exhaust gas.

In the case of diesel engines in particular, the main problems are posed not so much by carbon monoxide (CO) and hydrocarbons (HC) as by nitric oxide (NOx) and particulate in the exhaust gas.

Numerous methods have been proposed whereby to minimize the particulate content of exhaust gas emitted into the atmosphere. Of these, fitting the exhaust pipe with a particulate filter has long been acknowledged in engine technology as undoubtedly the final solution to the problem of diesel engine particulate emissions.

A diesel particulate filter (DPF)—also known as a particulate trap (soot catcher or bare trap)—normally comprises a number of parallel channels with alternating porous barrier walls.

More specifically, the barriers force the exhaust gas to flow through the lateral walls of the channels, so that the unburned particles constituting the particulate are first retained in the pores of the lateral walls, and, when the pores eventually become clogged, accumulate and form a porous layer on the inner surfaces of the channel walls.

As the particulate accumulates on the inner surfaces of the channel walls, the pressure drop through the filter, and therefore the backpressure generated by the filter, also increases.

If not removed eventually, an excessive accumulation of particulate therefore results in:

impaired performance, driving comfort, and consumption of the engine, until the engine eventually stalls; and destruction of the filter itself in the event of self-firing and uncontrolled combustion of the particulate. That is, in particular driving conditions, a large accumulation of particulate may give rise to "critical" regeneration phenomena, in turn resulting in sudden, uncontrolled particulate combustion, overheating of the ceramic matrix of the filter, and therefore damage to the filter itself.

The trapped particulate must therefore be removed regularly by "regenerating" the particulate filter, which, in engine technology, means burning the accumulated particulate (substantially carbon, C) which, in contact with the oxygen in the exhaust gas, is converted into CO and $CO_2$.

This reaction, however, only occurs naturally (i.e. without using additives) at temperatures over roughly 600° C., which are much higher than those at the filter inlet in normal engine operating conditions.

In certain conditions, i.e. on detecting a given accumulation of particulate in the filter, the exhaust gas temperature at the filter inlet must therefore be increased artificially to 600° C. to initiate particulate combustion.

Regeneration of particulate filters is the main problem posed by use of this sort of filter in the automotive industry.

Numerous methods of artificially increasing exhaust gas temperature at the filter inlet to initiate particulate combustion have been proposed and actually implemented.

These roughly fall into two major categories, depending on the approach adopted: a first category based on the use of a fuel additive, which acts as a catalyst to reduce regeneration initiation temperature by roughly 100–150° C.; and a second category involving no fuel additive.

Additive-based methods of initiating particulate combustion require:

an exhaust system comprising a catalyst and particulate filter integrated in a single canister;

a high-volume particulate filter, typically equal to twice the engine displacement;

a fuel additive (cerium-based) to reduce regeneration initiation temperature by 100–150° C.;

a highly complex on-vehicle automatic additive feed and metering system; and engine control strategies to increase temperature at the filter inlet, on account of the required temperatures not being achievable in normal engine operating conditions. This type of system in fact only operates correctly in medium-load engine operating conditions; whereas, in the case of prolonged low-load operation (e.g. in city traffic) and/or low external temperatures (in winter), the exhaust gas often fails to reach initiation temperature.

Additive-based particulate combustion initiation methods provide for initiating regeneration of particulate filters at about 450–500° C. with a low backpressure generated by the filter, but have significant drawbacks which prevent them from being used to full advantage:

they are complex, particularly as regards the automatic additive feed and metering system;

a high-volume particulate filter must be installed, on account of the additive in the fuel leaving a gradually increasing ash deposit in the filter;

despite the high volume of the particulate filter, the ash must still be "cleaned off" roughly every 80,000 km; cerium, in fact, produces large amounts of ash which accumulate, together with the particulate, inside the filter, and which cannot be eliminated by regeneration; as a result, the backpressure of the filter gradually increases with mileage, so that the filter must be dismantled and cleaned regularly to remove the accumulated ash;

high cost of both the automatic additive feed and metering system and the high-volume particulate filter.

On account of the above drawbacks, non-additive-based particulate combustion initiation methods are now preferred by most car manufacturers.

One solution proposed and implemented to increase the exhaust gas temperature in particulate filters artificially without recourse to an additive comprises fitting the particulate filter with heating elements which are activated periodically to heat the filter to the temperature initiating combustion of the trapped particulate.

More recently, however, solutions have been proposed whereby the temperature of the exhaust gas at the particulate filter inlet is increased by engine control strategies.

The most commonly used strategies to increase temperature at the particulate filter inlet comprise:

acting on the main injection to delay combustion;

post-injection; or reducing air intake (e.g. by reducing supercharging or throttling intake).

The delayed main injection based strategy is limited by the main injection only being delayable up to a certain point, beyond which combustion would become unstable, thus resulting in misfiring, white/blue smoke, and driving problems, in particular "swooning" phenomena. In low engine speed and load conditions, in particular, this strategy therefore fails to achieve high temperatures at the filter inlet.

In European Patent Application WO 96/03571 filed by the present Applicant, on the other hand, a strategy is proposed whereby the temperature of the exhaust gas at the particulate filter inlet is increased by performing, in addition to the main injection, a post-injection at the expansion stroke.

Timing of the post-injection with respect to the main injection and the amount of fuel injected are so determined that fuel combustion at the expansion stroke increases the temperature of the exhaust gas sufficiently to initiate regeneration of the particulate filter.

In European Patent Application WO 96/03572, also filed by the present Applicant, a strategy is proposed whereby the temperature of the exhaust gas at the particulate filter inlet is increased by performing, in addition to the main injection, a post-injection at the exhaust stroke.

More specifically, since the particulate filter is normally integrated in a single canister together with a DeNOx catalyst upstream from the particulate filter, a post-injection performed predominantly at the exhaust stroke means the injected fuel has no, or only very little, effect on combustion and is therefore supplied, unburned, directly to the catalyst.

The unburned hydrocarbons thus introduced into the catalyst initiate an exothermic oxidation reaction which increases the temperature of the exhaust gas at the catalyst outlet and therefore at the particulate filter inlet.

Unlike additive-based methods, non-additive-based particulate combustion initiation methods require:

a particulate filter of a volume substantially equal to the engine displacement, i.e. half the volume required by additive-based particulate combustion initiation methods;

an exhaust system which may either:

have the same configuration as that required by additive-based particulate combustion initiation methods, i.e. comprising a catalyst and particulate filter integrated in a single canister; or comprise one filter on which are deposited both the oxidizing elements of the catalyst, and initiation-temperature-reducing metals (Ce+Pt) (catalyzed soot filter);

no fuel additive;

no on-vehicle automatic additive feed and metering system;

engine control strategies to increase the temperature at the particulate filter inlet.

Using an exhaust system comprising a catalyst and particulate filter integrated in a single canister, regeneration is initiated t around 600° C., and the particulate filter generates a low backpressure; whereas, using an exhaust system comprising one filter on which are deposited both the oxidizing elements of the catalyst and initiation-temperature-reducing metals, regeneration is initiated at around 450° C., but the particulate filter generates a high backpressure, and regeneration efficiency may be impaired by cesium-particulate contact and may also drift, i.e. resulting in an increase in regeneration initiation temperature.

SUMMARY OF THE INVENTION

It is an object of the present invention to provide an improved method of initiating regeneration of a particulate filter, designed to eliminate the drawbacks of the above methods, i.e. which requires no fuel additive; guarantees exhaust gas temperatures of over 600° C. at the particulate filter inlet, thus initiating regeneration of the particulate filter, in all engine operating conditions; and provides for stable combustion during regeneration to ensure good driving conditions with no "swooning" phenomena and no white/blue smoke at the exhaust caused by misfiring.

According to the present invention, there is provided a method of initiating regeneration of a particulate filter for a diesel engine with a common rail injection system, as claimed in claim 1.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
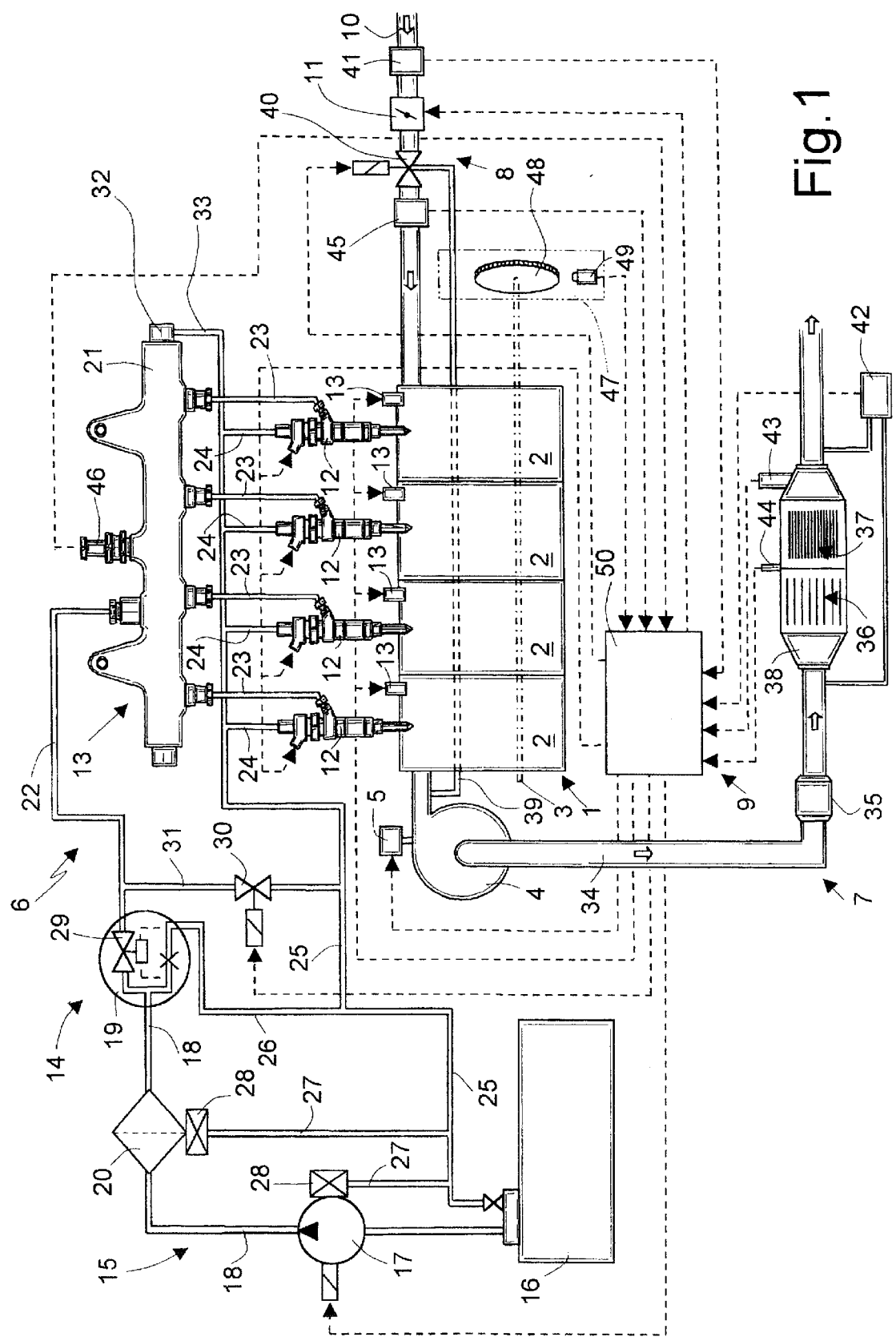
FIG. 1 shows a schematic diagram of an engine and relative intake, injection, exhaust, and exhaust gas recirculating systems.

Number 1 in FIG. 1 indicates a supercharged direct-injection diesel engine comprising a number of cylinders 2; a drive shaft 3; a variable-geometry turbosupercharger 4 with an electrically controlled actuator (pressure modulator) 5; a common rail injection system 6; a combustion gas exhaust system 7; an exhaust gas recirculating (EGR) system 8; and an electronic control system 9 for controlling injection and diagnosing leakage in the injection system.

Injection system 6 substantially comprises an air intake manifold 10 fitted with a proportional electric throttle valve 11; a number of injectors 12—one for each cylinder 2 of engine 1—for supplying high-pressure fuel to cylinders 2 of engine 1; a number of preheating plugs 13—one for each cylinder 2; a high-pressure feed circuit 14 for feeding high-pressure fuel to injectors 12; and a low-pressure feed circuit 15 for feeding low-pressure fuel to high-pressure feed circuit 14.

Low-pressure feed circuit 15 comprises a fuel tank 16; a feed pump 17, e.g. electric, immersed in the fuel in tank 16 (but shown outside tank 16 for the sake of clarity); a low-pressure feed line 18 connecting feed pump 17 to a high-pressure pump 19 of high-pressure feed circuit 14; and a fuel filter 20 located along low-pressure line 18, between feed pump 17 and high-pressure pump 19.

In addition to high-pressure pump 19, high-pressure feed circuit 14 also comprises a known common rail 21 connected by a high-pressure feed line 22 to high-pressure pump 19, and by respective high-pressure feed conduits 23 to injectors 12, which are also connected by respective recirculating conduits 24 to a drain line 25 in turn connected to tank 16 to feed part of the fuel, used in known manner by and for operating injectors 12, back into tank 16.

Drain line 25 is also connected to high-pressure pump 19 by a recirculating conduit 26, and to feed pump 17 and fuel filter 20 by respective recirculating conduits 27 and respective overpressure valves 28.

High-pressure pump 19 comprises an on/off or so-called shut-off valve 29 (shown schematically) for feeding the pumping elements (not shown) of high-pressure pump 19 when a pressure difference exists between low-pressure feed line 18 and recirculating conduit 26.

High-pressure feed circuit 14 also comprises a pressure regulator 30 connected between high-pressure feed line 22 and drain line 25 by a recirculating conduit 31, and which, when activated, feeds part of the fuel supplied to common rail 21 by high-pressure pump 19 back into tank 16, so as to regulate—in known manner not described in detail—the pressure of the fuel supplied by high-pressure pump 19 and, therefore, the fuel pressure in common rail 21 and injection pressure.

High-pressure feed circuit 14 also comprises a pressure relief device 32 connected on one side to common rail 21 and on the other to drain line 25 by a recirculating conduit 33, and which prevents the fuel in common rail 21 from exceeding a predetermined maximum pressure.

Exhaust system 7 comprises a combustion gas exhaust manifold 34 along which turbosupercharger 4, a DeNOx pre-catalyst 35, an actual DeNOx catalyst 36, and a particulate filter 37 are arranged in series; catalyst 36 and particulate filter 37 being integrated in a single canister 38.

Alternatively, the functions of catalyst 36 and particulate filter 37 may be performed by one component known as a catalyzed soot filter (not shown).

Chemical components for reducing particulate combustion temperature may be added to particulate filter 37, regardless of whether it is separate from or integrated with catalyst 36.

Exhaust gas recirculating system 8 feeds part of the exhaust gas in exhaust manifold 34 of engine 1 back into intake manifold 10 to reduce combustion temperature and the formation of nitric oxide (NOx), and is represented schematically by an exhaust gas recirculating conduit 39 connecting exhaust manifold 34, at a point upstream from turbosupercharger 4, to air intake manifold 10, at a point downstream from throttle valve 11, and by a regulating or so-called EGR valve 40 located along exhaust gas recirculating conduit 39, at the point of connection to air intake manifold 10.

Electronic control system 9 comprises an airflow meter 41 located along air intake manifold 10, upstream from throttle valve 11, and generating an airflow signal indicating airflow in air intake manifold 10; a differential pressure sensor 42 having a first and second input connected respectively to the inlet of catalyst 36 and the outlet of particulate filter 37, and an output supplying a pressure signal indicating the pressure drop between the inlet and outlet of particulate filter 37, which, as is known, indicates the amount of particulate accumulated in particulate filter 37; a first temperature sensor 43 located at the outlet of particulate filter 37 and supplying a first temperature signal indicating the exhaust gas temperature at the outlet of particulate filter 37; and a second temperature sensor 44 located at the inlet of particulate filter 37 and supplying a second temperature signal indicating the exhaust gas temperature at the inlet of particulate filter 37.

Alternatively, second temperature sensor 44 may also be connected to the inlet of catalyst 36.

Electronic control system 9 also comprises a first pressure sensor 45 located along air intake manifold 10, downstream from EGR valve 40, and generating a first pressure signal indicating the air pressure in intake manifold 10 downstream from EGR valve 40, and therefore the boost pressure of engine 1; a second pressure sensor 46 located on common rail 21 and generating a second pressure signal indicating the fuel pressure in common rail 21, and therefore the fuel injection pressure; a drive shaft angular speed and position measuring device 47, in turn comprising a known pulse wheel 48 fitted to drive shaft 3, and an electromagnetic sensor 49 facing pulse wheel 48 and generating a position and speed signal indicating the angular speed and position of pulse wheel 48, and therefore the angular speed and position of drive shaft 3; and an electronic control unit (ECU) 50, e.g. defined by the engine control unit, which is connected to temperature sensors 43, 44, to pressure sensors 45, 46, to airflow meter 41, and to drive shaft angular speed and position measuring device 47, and supplies drive signals for injectors 12, preheating plugs 13, throttle valve 11, EGR valve 40, pressure modulator 5 of turbosupercharger 4, pressure regulator 30, and feed pump 17.

The present invention is the result of in-depth research by the Applicant into the possibility of initiating regeneration to a particulate filter by means of consecutive multiple injections at each engine cycle and in each engine cylinder.

More specifically, European Patent Application EP 1035314, filed by the Applicant on Mar. 3, 2000 and the content of which is considered fully included herein, describes injection strategies comprising up to a maximum of six consecutive multiple injections, and the present invention is the result of research by the Applicant into the possibility of exploiting such multiple injections to initiate regeneration of a particulate filter.

For a clear understanding of the present invention, a brief summary will now be given of some of the main characteristics of the invention described in the above European patent application, to which the reader is referred, however, for details concerning timing and possible combinations of the six multiple injections, their effect on engine performance, the amount of fuel injected at each injection, and the injection strategies, i.e. number and type of injections, possible as a function of the operating point of the engine, as defined by the speed, torque, and operating conditions, e.g. temperature, of the engine.

Figure 2:
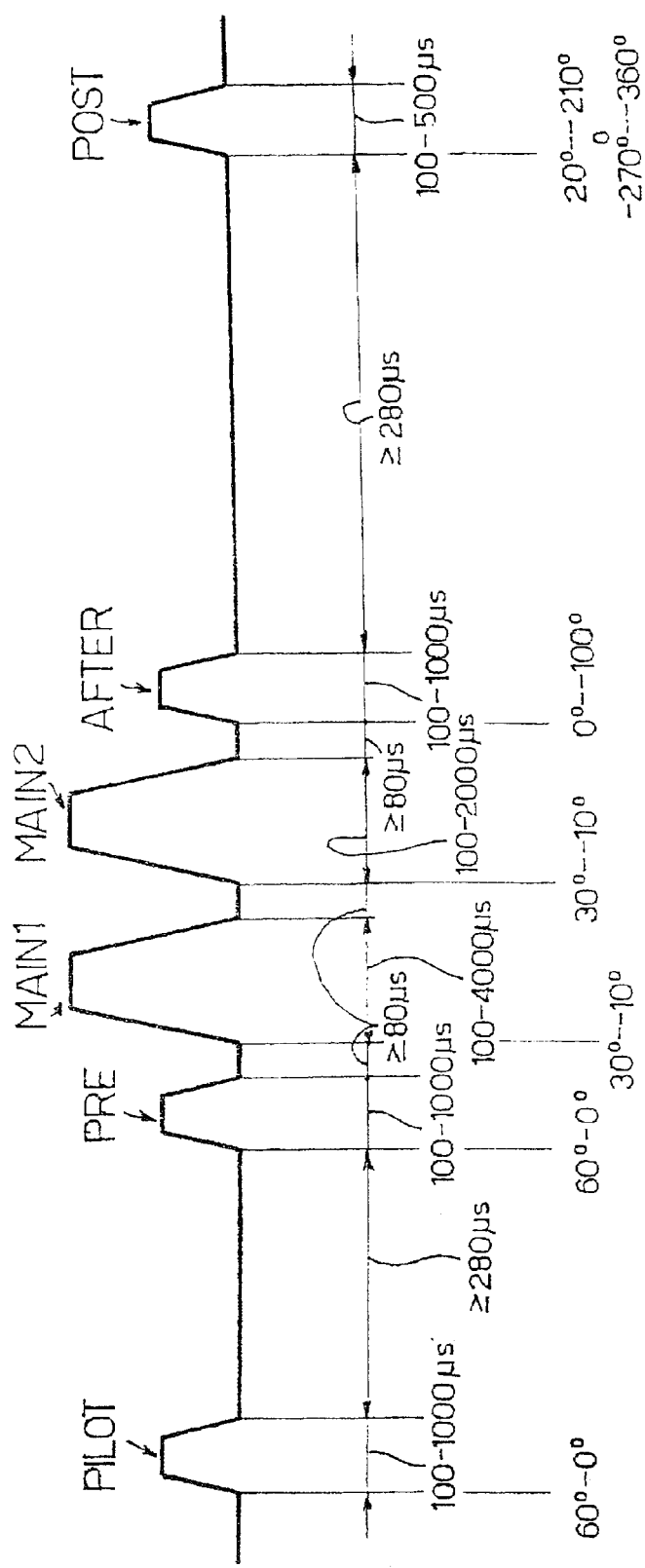
FIG. 2 shows six multiple injections performed consecutively by a known common rail injection system at each engine cycle and in each engine cylinder.

FIG. 2 shows the six multiple injections performed consecutively by common rail injection system 6 at each engine cycle and in each engine cylinder.

More specifically, the six multiple injections comprise two closely spaced main injections indicated MAIN1 and MAIN2; two pre-injections preceding the main injections and indicated PILOT and PRE; and two post-injections following the main injections and indicated AFTER and POST.

More specifically:
the two main injections MAIN1 and MAIN2 are performed around the end-of-compression top dead-center position, i.e. at engine angles within a range astride the end of the compression stroke and the start of the expansion stroke;
pre-injection PRE is performed close enough to main injections MAIN1, MAIN2 to participate, together with the main injections, in actual fuel combustion; while pre-injection PILOT is further away from main injections MAIN1, MAIN2 and is performed at the compression stroke;
post-injection AFTER is performed close enough to main injections MAIN1, MAIN2 to participate, together with the main injections and the first pre-injection PRE, in actual fuel combustion; while post-injection POST is further away from main injections MAIN1, MAIN2 and is performed at the exhaust stroke or at the end of the expansion stroke.

More specifically, the first main injection MAIN1 lasts from 100 to 4000 $\mu$s and starts at an engine angle ranging between 30° before and 10° after the end-of-compression top dead-center position, and which is mainly a function of engine speed, load, and cooling water temperature.

The second main injection MAIN2 lasts from 100 to 2000 µs and is performed after first main injection MAIN1 with the following timing characteristics:

it starts at an engine angle ranging between 30° before and 10° after the end-of-compression top dead-center position; and it starts at least 80 µs after first main injection MAIN1 ends.

The first post-injection AFTER lasts from 100 to 1000 µs and is performed after second main injection MAIN2 with the following timing characteristics:

it starts at an engine angle ranging between 0° (i.e. end-of-compression top dead-center position) and 100° after the end-of-compression top dead-center position; and it starts at least 80 µs after second main injection MAIN2 ends.

The second post-injection POST lasts from 100 to 500 µs and is performed after first post-injection AFTER with the following timing characteristics:

it starts at an engine angle ranging between 20° before and 210° after the end-of-compression top dead-center position, or between 270° and 360° after the end-of-compression top dead-center position; and it starts at least 280 µs after first post-injection AFTER ends.

The first pre-injection PILOT lasts from 100 to 1000 µs and is performed before second pre-injection PRE with the following timing characteristics:

it starts at an engine angle ranging between 60° before the end-of-compression top dead-center position and 0° (i.e. the end-of-compression top dead-center position); and it ends at least 280 µs before second pre-injection PRE starts.

The second pre-injection PRE lasts from 100 to 1000 µs and is performed after first pre-injection PILOT and before first main injection MAIN1 with the following timing characteristics:

it starts at an engine angle ranging between 60° before the end-of-compression top dead-center position and 0° (i.e. the end-of-compression top dead-center position); and it ends at least 80 µs before first main injection MAIN1 starts.

The above injection timing is memorized in control unit 50 which, to perform the multiple injections, first calculates the start and end engine angle values of first main injection MAIN1 as a function of the speed, load, and cooling water temperature of the engine, and then, using the memorized timing, determines the start and end engine angle values of each of the other injections.

Each of the above injections corresponds to a specific effect on engine operation for a specific purpose.

That is:

performing two main injections MAIN1, MAIN2, as opposed to a conventional single main injection, reduces the temperature peaks generated by combustion, and therefore the amount of nitric oxide NOx generated during combustion;

post-injection AFTER—which, as stated, participates in actual combustion—produces post-oxidation of the exhaust gas in the cylinder, thus reducing the amount of particulate generated during combustion;

post-injection POST injects a certain amount of fuel at the exhaust stroke, which, since actual combustion is over, is not burned and reaches the exhaust unchanged, thus increasing the hydrocarbons HC at the exhaust, which in turn activate and improve the efficiency of catalyst 36;

pre-injection PRE—which, as stated, participates in actual combustion—reduces ignition lag, i.e. the time lapse between fuel injection into the cylinder at main injection MAIN1 and the actual start of combustion in the cylinder; reducing ignition lag therefore reduces the combustion noise of the engine;

pre-injection PILOT increases the pressure in the cylinder at the end of the compression stroke, thus reducing engine start-up time, reducing engine warm-up noise and smoke levels, and increasing engine torque at low speed.

At each engine cycle and in each engine cylinder, either all six of the above injections, with the timing described, or subgroups of them may be performed, depending on the injection strategy target.

If not all six injections are performed, the timing conditions relative to the engine angle values at which the performed injections are to start are the same as indicated above, whereas the timing conditions of the performed injections relative to lag or lead with respect to the preceding injections are as follows:

in the absence of second pre-injection PRE, the lead of first pre-injection PILOT indicated above is taken to refer to first main injection MAIN1, i.e. first pre-injection PILOT ends at least 280 µs before first main injection MAIN1 starts;

in the absence of second main injection MAIN2, the lag of first post-injection AFTER indicated above is taken to refer to first main injection MAIN1, i.e. first post-injection AFTER starts at least 80 µs after first main injection MAIN1 ends, and the lag of second post-injection POST with respect to first post-injection AFTER is the same as indicated above;

in the absence of first post-injection AFTER, the lag of second post-injection POST indicated above is taken to refer to second main injection MAIN2, i.e. second post-injection POST starts at least 280 µs after second main injection MAIN2 ends;

in the absence of second main injection MAIN2 and first post-injection AFTER, the lag of second post-injection POST indicated above is taken to refer to first main injection MAIN1, i.e. second post-injection POST starts at least 280 µs after first main injection MAIN1 ends.

As stated, for each group of injections performed, the amount of fuel injected at each multiple injection can also be regulated, and different injection strategies can be performed as a function of the operating point of the engine. For more details, the reader is referred to the aforementioned European patent application.

In-depth research by the Applicant into initiating regeneration of particulate filters by consecutive multiple injections at each engine cycle and in each engine cylinder has led to the identification, for each operating point of the engine, of particular combinations and timings of the above multiple injections, by which particulate filter regeneration is initiated.

Research by the Applicant also shows how the effect of such multiple injection combinations and timings on particulate filter regeneration can be further improved by working on other engine and/or injection system quantities, such as intake airflow, injection pressure, and the amount of exhaust gas recirculated.

Roughly speaking, the regeneration strategies determined by the Applicant comprise the following steps to increase exhaust gas temperature at the particulate filter inlet:

performing, appropriately delayed with respect to timing in particulate filter non-regeneration conditions, three or four of the PILOT, PRE, MAIN1 and AFTER injections which participate in the combustion process and provide for achieving delayed, stable combustion by increasing exhaust gas temperature (as regards initiating particulate filter regeneration, second main injection MAIN2 and first post-injection AFTER are considered alternatives);

performing a POST injection to supply HC to catalyst 36 and exploit the resulting exothermic reaction to further increase exhaust gas temperature at the outlet of catalyst 36, and therefore at the inlet of particulate filter 37; this injection is also performed as a function of the exhaust gas temperature at the inlet of particulate filter 37, if fitted with temperature sensor 44, or at the inlet of catalyst 36, if fitted with temperature sensor 44, and/or as a function of the exhaust gas temperature at the outlet of particulate filter 37 if a catalyzed soot filter is used;

reducing airflow by throttling air intake by means of throttle valve 11, and/or reducing boost pressure by means of closed-loop-controlled actuator 5 of turbosupercharger 4;

reducing fuel injection pressure;

adjusting the amount of recirculated exhaust gas by means of EGR valve 40;

activating, or not, preheating plugs 13.

In this way, and particularly by performing multiple injections, high exhaust gas temperatures of or over 600° C. (particulate combustion initiation threshold) can be achieved at the inlet of particulate filter 37 in each operating condition of the engine, thus regenerating particulate filter 37 with no misfiring which would otherwise result in impaired driving conditions and blue smoke.

According to a first aspect of the present invention, regeneration strategies are only performed in the enabling conditions described below.

In particular:

regeneration strategies are performed when a given quantity of accumulated particulate is determined on the basis of the pressure drop through particulate filter 37 and/or the temperature of particulate filter 37 itself; such strategies may also be performed solely on the basis of mileage, or on the basis of both information items, or even on the basis of a variable time period;

regeneration strategies are only performed when the cooling fluid exceeds a given threshold (40–60° C.—temperature-controlled engine);

regeneration strategies are performed for a fixed time period, which is that in which the exhaust gas temperature at the inlet of particulate filter 37 exceeds a given threshold (a clock times how long temperature remains above the given threshold). If the temperature is below the threshold, the time period is considered ineffective, but the regeneration strategies remain enabled. More specifically, enabling time may range from 1 to 60 minutes, and the temperature threshold from 400 to 650° C. In other words, the exhaust gas temperature at the inlet of particulate filter 37 (or at the outlet in the case of a catalyzed soot filter) must be guaranteed above the threshold throughout the set time period.

According to a further aspect of the present invention, different regeneration strategies are performed for different engine operating conditions, as defined by engine speed and the amount of fuel injected per cycle.

More specifically, in an engine graph of engine speed versus brake mean effective pressure (BMEP), various areas are identified corresponding to different engine operating conditions, and in which different strategies are performed.

The various engine operating conditions are:

full load: 800–5000 rpm engine speed, and engine load of 90–100% of maximum load;

normal operation: 1000–5000 rpm engine speed, and engine load of 5–90% of maximum;

idling: 800–1000 rpm engine speed, and engine load of 0–5% of maximum;

cut-off: 1000–5000 rpm engine speed, and engine load of 0–5% of maximum.

The normal operating condition can be divided further into:

town-traffic condition: engine speed below 3000 rpm and engine load below 30% of maximum; and open-road condition: engine speed below 3000 rpm and engine load over 30% of maximum, or engine speed over 3000 rpm and engine load of 5–90% of maximum.

The following is a description of the regeneration strategies performed in the above engine operating conditions.

1. Idling

In this engine operating condition, the five PILOT, PRE, MAIN1, AFTER and POST injections participating in combustion are performed.

More specifically, the POST injection is performed about 180° or 315° after the end-of-compression top dead-center position, if the temperature of catalyst 36 is high enough (over 200° C.) to oxidize the HC produced. If it is not, the POST injection is performed when the engine exhaust valves are still fully closed, i.e. 120° after the end-of-compression top dead-center position.

The amount of fuel injected in the POST injection is regulated proportionally, as a function of the exhaust gas temperature at the outlet of catalyst 36, as follows:

0% up to 200° C.;

0–100% proportionally from 200 to 400° C.;

100% over 400° C.

The PILOT injection is delayed roughly 15° with respect to its timing in particulate filter non-regeneration conditions, so that a PRE injection can be performed and so timed that the fuel injected by it is burns substantially at the end-of-compression top dead-center position.

These two PILOT and PRE injections delay the MAIN1 injection up to 35° with respect to its timing in particulate filter non-regeneration conditions.

As a result, the AFTER injection is performed as much as 80° after the end-of-compression top dead-center position.

The injection leads are selected to ensure complete oxidation of the injected fuel: each injection must create the best possible conditions in the combustion chamber for the next injection to burn properly and so achieve stable combustion.

Injection pressure is reduced with respect to the particulate filter non-regeneration condition to prolong combustion.

In the idling condition, fresh air intake to the engine is also throttled, no exhaust gas is recirculated to avoid reducing the oxygen percentage in the air intake, and the engine preheating plugs are activated to increase engine load.

2. Normal Operation

As stated, this can be further divided into town-traffic and open-road engine operating conditions.

2.1 Town Traffic

In town-traffic conditions (engine speed below 3000 rpm and engine load below 30% of maximum), the five PILOT, PRE, MAIN1, AFTER and POST injections are performed.

The PILOT injection is delayed on average by 2° to 15° with respect to its timing in particulate filter non-regeneration conditions, so that the fuel injected at the PRE injection burns about 10° to 15° after the end-of-compression top dead-center position, thus creating the conditions to delay the MAIN1 injection by 15° to 35° with respect to the end-of-compression top dead-center position.

In the town-traffic condition, the AFTER injection lead may be delayed roughly 45° to 75° with respect to the end-of-compression top dead-center position, while the POST injection is performed close to the end-of-expansion bottom dead-center position (i.e. when the exhaust valves are wide-open), or roughly 315° to 360° after the end-of-compression top dead-center position to reduce oil dilution.

Injection pressure is reduced by 50–200 bars to prolong injection for a given amount of fuel injected, and so prolong combustion and obtain higher exhaust gas temperatures.

In this condition too, the preheating plugs are activated and fresh air intake throttled (the preheating plugs are turned on as a function of the engine operating point, i.e. engine speed and load).

It should be pointed out that, below 3000 rpm, the PILOT injection is maintained up to the full-load engine condition to allow the MAIN1 injection to also burn correctly in power conditions.

2.2 Open Road

In the open-road condition with an engine speed below 3000 rpm and engine load of 30–90% of maximum, the PILOT, MAIN1, AFTER and POST injections are performed; whereas, with an engine speed over 3000 rpm and engine load of 5–90% of maximum, the MAIN1, AFTER and POST injections are performed.

If performed, the PILOT injection is not delayed with respect to the particulate filter non-regeneration condition.

The MAIN1 injection, however, is delayed roughly 5° to 15° with respect to its timing in particulate filter non-regeneration conditions, while the AFTER injection lead is delayed 35° to 50° with respect to the end-of-compression top dead-center position.

The POST injection is performed 180° or 315° after the end-of-compression top dead-center position.

In these conditions, exhaust gas is recirculated to reduce the nitric oxide produced by the engine and at the same time increase engine air intake temperature.

Injection pressure is the same as in particulate filter non-regeneration conditions, or is increased slightly (20–50 bars) to improve vaporization of the injected fuel and so reduce HC production.

In both town-traffic and open-road conditions, the amount of fuel injected in the POST injection is regulated proportionally as a function of the exhaust gas temperature at the outlet of catalyst 36, as described previously.

3. Full Load

Full-load conditions are the engine operating points with 90–100% of maximum torque at a given engine speed. Since, in this case, engine performance must be guaranteed, the PILOT, MAIN1 and POST injections are performed at engine speeds below roughly 3000 rpm, and the MAIN1 and POST injections for engine speeds over roughly 3000 rpm.

To preserve engine performance, the PILOT and MAIN1 injection leads are the same as in normal particulate filter non-regeneration conditions.

For the same reason, as engine load increases, the delay in the leads with respect to particulate filter non-regeneration conditions must be reduced, eventually reaching zero at full load.

The POST injection is performed roughly 180° or 315° after the end-of-compression top dead-center position to produce the HC required to increase the temperature at the inlet of particulate filter 37 to the particulate combustion initiation threshold.

The amount of fuel injected in the POST injection is regulated proportionally as a function of the exhaust gas temperature at the outlet of catalyst 36, as described previously.

Injection pressure is exactly the same as in the power curve.

4. Cut-Off

In the cut-off engine condition, a distinction is made between prolonged cut-off and short cut-off, as for example, when shifting gear.

4.1 Prolonged Cut-Off

In the prolonged cut-off condition, fresh air intake to the engine is throttled to avoid cooling the catalysts, no exhaust gas is recirculated, and the POST injection is performed 180° or 315° after the end-of-compression top dead-center position to exploit the exothermic HC oxidation reaction in catalyst 36.

The amount of fuel injected in the POST injection is regulated proportionally as a function of the exhaust gas temperature at the outlet of catalyst 36, as described previously.

4.2 Short Cut-Off

In the short cut-off condition, as for example when shifting gear, no particular strategy is adopted.

The advantages of the present invention will be clear from the foregoing description.

In particular, with no fuel additive required, the present invention guarantees exhaust gas temperatures of over 600° C. at the inlet of particulate filter 37, thus initiating regeneration of particulate filter 37, in all engine operating conditions—in particular, low-load, low-engine-speed conditions, as in town traffic and when idling—and provides for stable combustion during regeneration to ensure good vehicle driving conditions with no "swooning" phenomena or white/blue smoke at the exhaust caused by misfiring.

In addition to solving the problem of particulate combustion, the present invention also provides for reducing gaseous emissions in conformance with EURO 4 emission standard 2005, and at very little cost in terms of fuel consumption and full-load performance.

Tests conducted by the Applicant, in fact, show that, whereas a 10-minute regeneration of particulate filter 37 produces a 200% increase in fuel consumption, regenerating particulate filter 37 every 500 km produces an average increase in fuel consumption of no more than 1.2%.

Clearly, changes may be made to the method as described and illustrated herein without, however, departing from the scope of the present invention as defined in the accompanying Claims.

What is claimed is:

1. A method of initiating regeneration of a particulate filter (37) for a diesel engine (1) with a common rail injection system (6), said common rail injection system (6) permitting, at each engine cycle and in each cylinder (2) of the engine (1), a fuel injection strategy comprising performance of one or more of the following injections: a main injection (MAIN1); a first pre-injection (PILOT) preceding said main injection (MAIN1) and performed at the compression stroke; a second pre-injection (PRE) preceding said main injection (MAIN1) and following said first pre-injection; a first post-injection (MAIN2, AFTER) following said main injection (MAIN1); and a second post-injection (POST) following said first post-injection (MAIN2, AFTER) and performed at the exhaust stroke; said second pre-injection (PRE) and said first post-injection (MAIN2, AFTER) being performed close enough to said main injection (MAIN1) to participate, together with the main injection, in the actual fuel combustion phase;

said method of initiating regeneration being characterized by the comprising the step of:

implementing, at each engine cycle and in each cylinder (2) of the engine (1), a fuel injection strategy wherein one or more of said first and said second pre-injection (PILOT, PRE), said main injection (MAIN1), and said first and said second post-injection (MAIN2, AFTER, POST) are performed, and wherein the timing of one or more of the injections performed is varied with respect to the timing of said injections in particulate filter non-regenerating conditions.

2. A method of initiating regeneration as claimed in claim 1, characterized in that the number and type of injections performed to initiate regeneration of the particulate filter vary as a function of engine operating conditions.

3. A method of initiating regeneration as claimed in claim 1, characterized in that the timing of the injections performed to initiate regeneration of the particulate filter is varied, with respect to the timing of said injections in particulate filter non-regenerating conditions, as a function of engine operating conditions.

4. A method of initiating regeneration as claimed in claim 3, characterized in that, in the idling engine operating condition, the fuel injection strategy to initiate regeneration of the particulate filter comprises performing said first and said second pre-injection (PILOT, PRE), said main injection (MAIN1), and said first and said second post-injection (MAIN2, AFTER, POST).

5. A method of initiating regeneration as claimed in claim 4, for an engine (1) with a combustion gas exhaust system (7) comprising catalyzing means (35), characterized in that, in the idling engine operating condition, said second post-injection (POST) is performed roughly 180° or 315° after the end-of-compression top dead-center position, if the temperature of said catalyzing means (35) is high enough to oxidize the hydrocarbons in the catalyzing means, or conversely roughly 120° after the end-of-compression top dead-center position.

6. A method of initiating regeneration as claimed in claim 4, characterized in that, in the idling engine operating condition, the timing of said first pre-injection (PILOT) is delayed roughly 15° with respect to the timing of the first pre-injection (PILOT) in particulate filter non-regeneration conditions.

7. A method of initiating regeneration as claimed in claim 4, characterized in that, in the idling engine operating condition, said second pre-injection (PRE) is so timed that the fuel injected by it burns substantially at the end-of-compression top dead-center position.

8. A method of initiating regeneration as claimed in claim 4, characterized in that, in the idling engine operating condition, the timing of said main injection (MAIN1) may be delayed up to 35° with respect to the timing of the main injection (MAIN1) in particulate filter non-regeneration conditions.

9. A method of initiating regeneration as claimed in claim 4, characterized in that, in the idling engine operating condition, said first post-injection (MAIN2, AFTER) is performed up to 80° after the end-of-compression top dead-center position.

10. A method of initiating regeneration as claimed in claim 1, characterized in that the variation in the timing of the injections performed to initiate regeneration of the particulate filter decreases alongside an increase in engine load, eventually reaching substantially zero in full-load conditions.

11. A method of initiating regeneration as claimed in claim 4, characterized in that, in the town-traffic engine operating condition, the fuel injection strategy to initiate regeneration of the particulate filter comprises performing said first and said second pre-injection (PILOT, PRE), said main injection (MAIN1), and said first and said second post-injection (MAIN2, AFTER, POST).

12. A method of initiating regeneration as claimed in claim 11, characterized in that, in the town-traffic engine operating condition, the timing of said first pre-injection (PILOT) is delayed on average 2° to 15° with respect to the timing of the first pre-injection (PILOT) in particulate filter non-regeneration conditions.

13. A method of initiating regeneration as claimed in claim 11, characterized in that, in the town-traffic engine operating condition, said second pre-injection (PRE) is so timed that the fuel injected by it burns substantially 10° to 15° after the end-of-compression top dead-center position.

14. A method of initiating regeneration as claimed in claim 11, characterized in that, in the town-traffic engine operating condition, the timing of said main injection (MAIN1) may be delayed roughly 15° to 35° with respect to the end-of-compression top dead-center position.

15. A method of initiating regeneration as claimed in claim 11, characterized in that, in the town-traffic engine operating condition, said first post-injection (MAIN2, AFTER) is performed roughly 45° to 75° after the end-of-compression top dead-center position.

16. A method of initiating regeneration as claimed in claim 11, characterized in that, in the town-traffic engine operating condition, said second post-injection (POST) is performed close to the end-of-expansion bottom dead-center position, or roughly 315° to 360° after the end-of-compression top dead-center position.

17. A method of initiating regeneration as claimed in claim 10, characterized in that, in the open-road engine operating condition, the fuel injection strategy to initiate regeneration of the particulate filter comprises performing at least said main injection (MAIN1) and said first and said second post-injection (MAIN2, AFTER, POST).

18. A method of initiating regeneration as claimed in claim 17, characterized in that, in the open-road engine operating condition, the fuel injection strategy to initiate regeneration of the particulate filter also comprises performing said first pre-injection (PILOT) at engine speeds below a first predetermined threshold.

19. A method of initiating regeneration as claimed in claim 17, characterized in that, in the open-road engine operating condition, the timing of said main injection (MAIN1) is delayed roughly 5° to 15° with respect to the timing of the main injection (MAIN1) in particulate filter non-regeneration conditions.

20. A method of initiating regeneration as claimed in claim 17, characterized in that, in the open-road engine operating condition, said first post-injection (MAIN2, AFTER) is performed roughly 35° to 50° after the end-of-compression top dead-center position.

21. A method of initiating regeneration as claimed in claim 17, characterized in that, in the open-road engine operating condition, said second post-injection (POST) is performed roughly 180° or 315° after the end-of-compression top dead-center position.

22. A method of initiating regeneration as claimed in claim 10, characterized in that, in the full-load engine operating condition, the fuel injection strategy to initiate regeneration of the particulate filter comprises performing at least said main injection (MAIN1) and said second post-injection (POST).

23. A method of initiating regeneration as claimed in claim 22, characterized in that, in the full-load engine operating condition, the fuel injection strategy to initiate regeneration of the particulate filter also comprises performing said first pre-injection (PILOT) at engine speeds below a second predetermined threshold.

24. A method of initiating regeneration as claimed in claim 22, characterized in that, in the full-load engine operating condition, the timings of said first pre-injection (PILOT) and said main injection (MAIN1) are the same as in particulate filter non-regeneration conditions.

25. A method of initiating regeneration as claimed in claim 22, characterized in that, in the full-load engine operating condition, said second post-injection (POST) is performed 180° or 315° after the end-of-compression top dead-center position.

26. A method of initiating regeneration as claimed in claim 10, characterized in that, in the prolonged cut-off engine operating condition, the fuel injection strategy to initiate regeneration of the particulate filter comprises performing only the second post-injection (POST).

27. A method of initiating regeneration as claimed in claim 26, characterized in that, in the prolonged cut-off engine operating condition, said second post-injection (POST) is performed 180° or 315° after the end-of-compression top dead-center position.

28. A method of initiating regeneration as claimed in claim 1, characterized in that the amount of fuel injected in said second post-injection (POST) to initiate regeneration of the particulate filter is regulated as a function of exhaust gas temperature.

29. A method of initiating regeneration as claimed in claim 28, characterized in that the amount of fuel injected in said second post-injection (POST) to initiate regeneration of the particulate filter is regulated in proportion to exhaust gas temperature.

30. A method of initiating regeneration as claimed in claim 1, for an engine (1) comprising an air intake system (10) with air intake regulating means (11), a fuel combustion exhaust gas recirculating system (8), and preheating plugs (13); characterized by also comprising one or more of the following steps:

throttling air intake;

reducing fuel injection pressure;

varying the amount of exhaust gas recirculated;

activating/deactivating the preheating plugs (13).

31. A method of initiating regeneration as claimed in claim 30, characterized in that said step of throttling air intake comprises the step of controlling said air intake regulating means.

32. A method of initiating regeneration as claimed in claim 30, for an engine comprising supercharging means, characterized in that said step of throttling air intake comprises the step of reducing the boost pressure of the engine.

33. A method of initiating regeneration as claimed in claim 1, characterized by also comprising the steps of:

determining the presence of particulate filter regeneration enabling conditions;

performing said fuel injection strategy to initiate regeneration of the particulate filter, on determining said regeneration enabling conditions.

34. A method of initiating regeneration as claimed in claim 33, characterized in that the fuel injection strategy to initiate regeneration of the particulate filter is performed on the basis of at least one of the following:

when information resulting from measuring the pressure drop through the particulate filter (37) and/or the temperature of the particulate filter (37) shows the accumulation of a given quantity of particulate;

mileage;

a variable time period;

when the temperature of the engine cooling fluid exceeds a given threshold.

35. A method of initiating regeneration as claimed in claim 33, characterized in that the fuel injection strategy to initiate regeneration of the particulate filter is of fixed duration, equal to the time in which the exhaust gas temperature at the inlet of the particulate filter (37) exceeds a given threshold.

* * * * *

UNITED STATES PATENT AND TRADEMARK OFFICE
CERTIFICATE OF CORRECTION

PATENT NO. : 6,666,020 B2
DATED : December 23, 2003
INVENTOR(S) : Tonetti et al.

It is certified that error appears in the above-identified patent and that said Letters Patent is hereby corrected as shown below:

<u>Title page,</u>
Item [75], Inventors, should read as follows:
-- [75]   Inventors:    Marco Tonetti, Torino
                              Giovanni Maria Rossie Sebastiano, Torino
                              Maurizio Mugnaini, Genova
                              Pierluigi Rellaecati, Torino --

Signed and Sealed this

Fourteenth Day of September, 2004

JON W. DUDAS
*Director of the United States Patent and Trademark Office*

UNITED STATES PATENT AND TRADEMARK OFFICE
CERTIFICATE OF CORRECTION

PATENT NO.    : 6,666,020 B2
DATED         : December 23, 2003
INVENTOR(S)   : Tonetti et al.

It is certified that error appears in the above-identified patent and that said Letters Patent is hereby corrected as shown below:

Title page,
Item [75], Inventors, should read as follows:
-- [75]  Inventors:    Marco Tonetti, Torino
                        Giovanni Maria Rossi Sebastiano, Torino
                        Maurizio Mugnaini, Genova
                        Pierluigi Rellecati, Torino --

This certificate supersedes Certificate of Correction issued September 14, 2004.

Signed and Sealed this

Twenty-fifth Day of January, 2005

JON W. DUDAS
*Director of the United States Patent and Trademark Office*